US010688893B2

(12) United States Patent
Hoover et al.

(10) Patent No.: US 10,688,893 B2
(45) Date of Patent: Jun. 23, 2020

(54) STOWABLE SEAT WITH BACKREST RELEASE

(71) Applicant: AMI Industries, Inc., Colorado Springs, CO (US)

(72) Inventors: Douglas E. Hoover, Colorado Springs, CO (US); Dominic J. Maglia, Pueblo, CO (US); Ryan Porter, Monument, CO (US)

(73) Assignee: AMI INDUSTRIES, INC., Colorado Springs, CO (US)

( * ) Notice: Subject to any disclaimer, the term of this patent is extended or adjusted under 35 U.S.C. 154(b) by 0 days.

(21) Appl. No.: 16/397,097

(22) Filed: Apr. 29, 2019

(65) Prior Publication Data

US 2019/0248255 A1   Aug. 15, 2019

Related U.S. Application Data

(62) Division of application No. 15/786,927, filed on Oct. 18, 2017, now Pat. No. 10,336,221.

(51) Int. Cl.
- *B60N 2/30* (2006.01)
- *B64D 11/06* (2006.01)
- *B60N 2/20* (2006.01)

(52) U.S. Cl.
CPC ............. *B60N 2/3047* (2013.01); *B60N 2/20* (2013.01); *B64D 11/0639* (2014.12)

(58) Field of Classification Search
CPC ............ B64D 11/0639; B64D 11/0627; B64D 11/0636; B64D 11/0691; B64D 11/0698; B60N 2/3047
See application file for complete search history.

(56) References Cited

U.S. PATENT DOCUMENTS

| | | | |
|---|---|---|---|
| 945,208 | A | 1/1910 | Arter |
| 1,132,004 | A | 3/1915 | Freise |
| 1,199,002 | A | 9/1916 | Freise |
| 1,761,673 | A | 6/1930 | Bruno |
| 2,257,211 | A | 9/1941 | Willoughby |
| 2,714,920 | A | 6/1955 | Hancock |

(Continued)

FOREIGN PATENT DOCUMENTS

| | | |
|---|---|---|
| EP | 2127939 | 12/2009 |
| EP | 2927127 | 10/2015 |

(Continued)

OTHER PUBLICATIONS

USPTO; Notice of Allowance dated Mar. 20, 2019 in U.S. Appl. No. 15/786,927.

(Continued)

*Primary Examiner* — David E Allred
(74) *Attorney, Agent, or Firm* — Snell & Wilmer, L.L.P.

(57) ABSTRACT

A stowable seat for an aircraft may comprise a housing and a backrest support configured to rotate relative to the housing. A locking mechanism comprising a first latch may be coupled to the backrest support. A releasing member may be in operable communication with the first latch. The releasing member may be configured to rotate the first latch relative to the backrest support. The releasing member may be located behind a cushion coupled to the backrest support.

7 Claims, 7 Drawing Sheets

(56) References Cited

U.S. PATENT DOCUMENTS

| | | | |
|---|---|---|---|
| 4,595,212 A * | 6/1986 | Haury | A61G 5/00 |
| | | | 280/250.1 |
| 4,902,069 A | 2/1990 | Lehnert | |
| 5,609,347 A * | 3/1997 | Dressel | A63C 10/04 |
| | | | 280/14.23 |
| 5,628,543 A | 5/1997 | Filipovich | |
| 5,662,377 A | 9/1997 | Holdampf | |
| 6,112,964 A * | 9/2000 | Cucheran | B60R 9/045 |
| | | | 224/309 |
| 6,231,101 B1 * | 5/2001 | Kamida | B60N 2/01583 |
| | | | 296/63 |
| 6,773,068 B2 * | 8/2004 | Shinozaki | B60N 2/01583 |
| | | | 297/344.1 |
| 6,896,322 B1 | 5/2005 | Foy | |
| 7,537,264 B2 * | 5/2009 | Maimin | B60J 7/141 |
| | | | 296/100.06 |
| 8,356,860 B2 * | 1/2013 | Nakaya | B60N 2/3013 |
| | | | 297/216.12 |
| 8,449,012 B2 | 5/2013 | Seibold | |
| 8,757,711 B2 | 6/2014 | Bertocchi | |
| 9,327,836 B2 | 5/2016 | Weitzel et al. | |
| 9,394,054 B2 | 7/2016 | Johnson et al. | |
| 9,650,146 B2 | 5/2017 | Boenning et al. | |
| 10,384,588 B2 * | 8/2019 | Beltowski | B60J 7/102 |
| 2002/0014795 A1 * | 2/2002 | Williams | A47C 1/023 |
| | | | 297/337 |
| 2003/0116387 A1 * | 6/2003 | Tanksley | B60T 1/005 |
| | | | 188/31 |
| 2003/0148647 A1 * | 8/2003 | Hisamatsu | H01R 13/6273 |
| | | | 439/258 |
| 2007/0113345 A1 * | 5/2007 | Reckelhoff | A61G 7/015 |
| | | | 5/624 |
| 2007/0158989 A1 * | 7/2007 | Ishizuka | B60N 2/206 |
| | | | 297/378.1 |
| 2008/0296951 A1 | 12/2008 | Goshima | |
| 2010/0207439 A1 * | 8/2010 | Sayama | B60N 2/01583 |
| | | | 297/310 |
| 2011/0018323 A1 | 1/2011 | Sayama | |
| 2011/0018326 A1 | 1/2011 | Sayama | |
| 2012/0007380 A1 | 1/2012 | Li | |
| 2014/0346756 A1 * | 11/2014 | Laffan | B62B 9/26 |
| | | | 280/648 |
| 2016/0376007 A1 | 12/2016 | Meindlhumer | |
| 2017/0043857 A1 | 2/2017 | Seibt | |
| 2018/0148178 A1 | 5/2018 | Koehler | |
| 2019/0061951 A1 | 2/2019 | Hoover | |
| 2020/0008990 A1 * | 1/2020 | Harrison | B62K 5/007 |

FOREIGN PATENT DOCUMENTS

| | | |
|---|---|---|
| FR | 2745244 | 8/1997 |
| FR | 2962714 | 1/2012 |

OTHER PUBLICATIONS

Pre-Search Communication dated Jan. 30, 2019 in EP Application No. 18 20 969.6.

European Patent Office, European Search Report dated Jun. 13, 2019 in Application No. 182000969.6.

* cited by examiner

STOWABLE SEAT WITH BACKREST RELEASE

CROSS-REFERENCE TO RELATED APPLICATIONS

This application is a divisional of, and claims priority to, U.S. application Ser. No. 15/786,927, filed Oct. 18, 2017 and entitled "STOWABLE SEAT WITH BACKREST RELEASE," which is incorporated herein by reference in its entirety for all purposes.

FIELD

The present disclosure relates to stowable seats, and, more specifically, to a stowable seat with a backrest release mechanism.

BACKGROUND

Aircraft cabin seats (also referred to as stowable seats) are used for flight attendant safety and comfort during taxi, takeoff, landing, and inflight rest periods. Aircraft cabin seats may include a backrest locking mechanism having exposed latches that are accessible from a top of the backrest. The latches being exposed may allow unintended persons to access the locking mechanism. The accessibility of the latches may create an opportunity to tamper with the locking mechanism. An unlocked backrest may cause inflight safety issues. Exposed latches may also compromise the backrest appearance and simplicity due to the extra parts and features that may be employed to shroud the latches.

SUMMARY

A stowable seat may comprise a housing and a seat pan configured to rotate about a first pivot joint coupled to the housing. A backrest configured to rotate relative to the seat pan. first locking mechanism comprising a first latch may be coupled to the backrest support. A releasing member may be in operable communication with the first latch. The releasing member may be configured to rotate the first latch about a second pivot joint coupled to the backrest support.

In various embodiments, the first latch may define a channel. The releasing member may be located in the channel. The first latch may define an aperture configured to limit a rotation of the first latch about the second pivot joint. A cushion may be located over the backrest support and the releasing member.

In various embodiments, the first locking mechanism may further comprise a spring coupled to the first latch. A release member guide may be coupled to the backrest support proximate the first pivot joint.

In various embodiments, a release member guide may be coupled to the backrest support. The release member guide may be located proximate an upper support rail of the backrest support. A strap may be coupled to the releasing member. A pin may be located within an opening defined by the strap. The pin and opening may be configured to limit a translation of the strap. In various embodiments, a locking post may be coupled to the housing. The first latch may be configured to engage the locking post.

In various embodiments, the backrest support may comprise a first vertical rail located proximate a first wall of the housing, and a second vertical rail located proximate a second wall of the housing. A second locking mechanism may be coupled to the backrest support. The second locking mechanism may comprise a second latch. The second latch may be coupled to the second vertical rail. The first latch may be coupled the first vertical rail. The releasing member may be coupled between the first latch and the second latch.

A seat for an aircraft may comprise a housing and a backrest support configured to rotate relative to the housing. A first locking mechanism may be coupled to the backrest support. A releasing member may be in operable communication with the first locking mechanism.

In various embodiments, the first locking mechanism may comprise a first latch configured to rotate relative to a first vertical rail of the backrest support. A pin may be located in an aperture defined by the first latch. The pin and aperture may be configured to limit a rotation of the first latch.

In various embodiments, a second locking mechanism may be coupled to the backrest support. The second locking mechanism may comprise a second latch configured to rotate relative to a second vertical rail of the backrest support. The releasing member may be coupled between the first latch and the second latch. In various embodiments, a strap may be coupled to the releasing member. A first spring may be coupled to the first latch and the first vertical rail. A second spring may be coupled to the second latch and the second vertical rail.

A backrest support for a stowable seat may comprise a first vertical rail and a first side of the backrest support and a second vertical rail located proximate a second side of the backrest support opposite the first side of the backrest support. A first latch may be coupled to the first vertical rail. A second latch may be coupled to the second vertical rail. A releasing member may be in operable communication with the first latch and the second latch. The releasing member may be configured to rotate the first latch relative to the first vertical rail and the second latch relative to the second vertical rail.

In various embodiments, a first release member guide may be located proximate the first vertical rail. A second release member guide may be located proximate the second vertical rail. The releasing member may be located through the first release member guide and the second release member guide. A strap may be coupled to the releasing member.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Throughout the present disclosure, like reference numbers denote like elements. Accordingly, elements with like element numbering may be shown in the figures, but may not be necessarily repeated herein for the sake of clarity. As used herein, "distal" refers to the direction outward, or generally, away from a reference component. As used herein, "proximate" refers to a direction inward, or generally, towards the reference component.

Stowable seats of the present disclosure may include a releasable backrest. In various embodiments, the backrest may comprise a support structure and a locking mechanism that may be coupled to the support structure. A releasing member, for example, a wire or a strap, may be in operable communication with the locking mechanism. Applying a load to the releasing member may translate, or rotate, a latch of the locking mechanism, allowing the backrest to rotate, exposing an area behind the backrest. The releasing member may be located behind a cushion mounted to the support structure. In this regard, the locking mechanism and/or releasing member may not be visible. Accordingly, how to access the locking mechanism and/or unlock the backrest may not be readily apparent to unintended persons.

Figure 1:
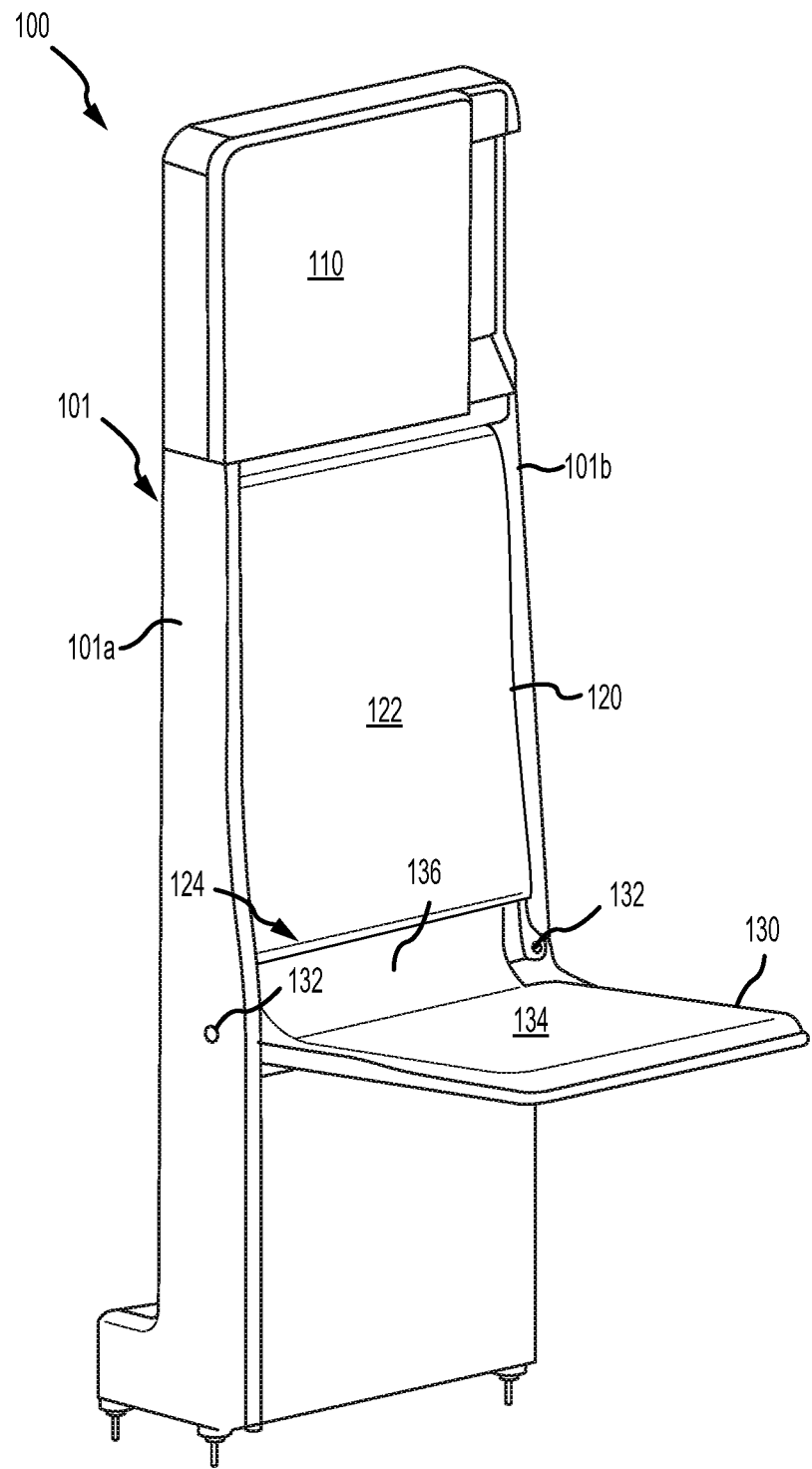
FIG. 1 illustrates a perspective view of an exemplary stowable seat in a seat-down position with a releasable backrest in a secured position, in accordance with various embodiments.

With reference to FIG. 1, a stowable seat 100 in a seat-down position is shown, in accordance with various embodiments. Stowable seat 100 may include a housing 101 having opposing walls 101a and 101b. Housing 101 may provide structural support for stowable seat 100. Stowable seat may include a seat pan 130, a backrest 120, and a head rest 110. Seat pan 130 may be configured to rotate about one or more pivot joint(s) 132 coupled to housing 101. In this regard, seat pan 130 may rotate relative to housing 101. Pivot joints 132 may allow seat pan 130 to be rotated toward and away from backrest 120. Seat pan 130 may include a seat cushion 134. Backrest 120 may comprise a cushion 122. In various embodiments, a piece of fabric 136 may extend between cushion 122 and seat cushion 134. FIG. 1 illustrates backrest 120 in a locked or secured position. As discussed in further detail below, backrest 120 may be releasable and may rotate relative to housing 101 and seat pan 130. With momentary reference to FIG. 4, backrest 120 may be rotated, about pivot joints 132, away from housing 101 and toward seat pan 130, thereby exposing an area 150 located behind backrest 120.

Figure 2A:
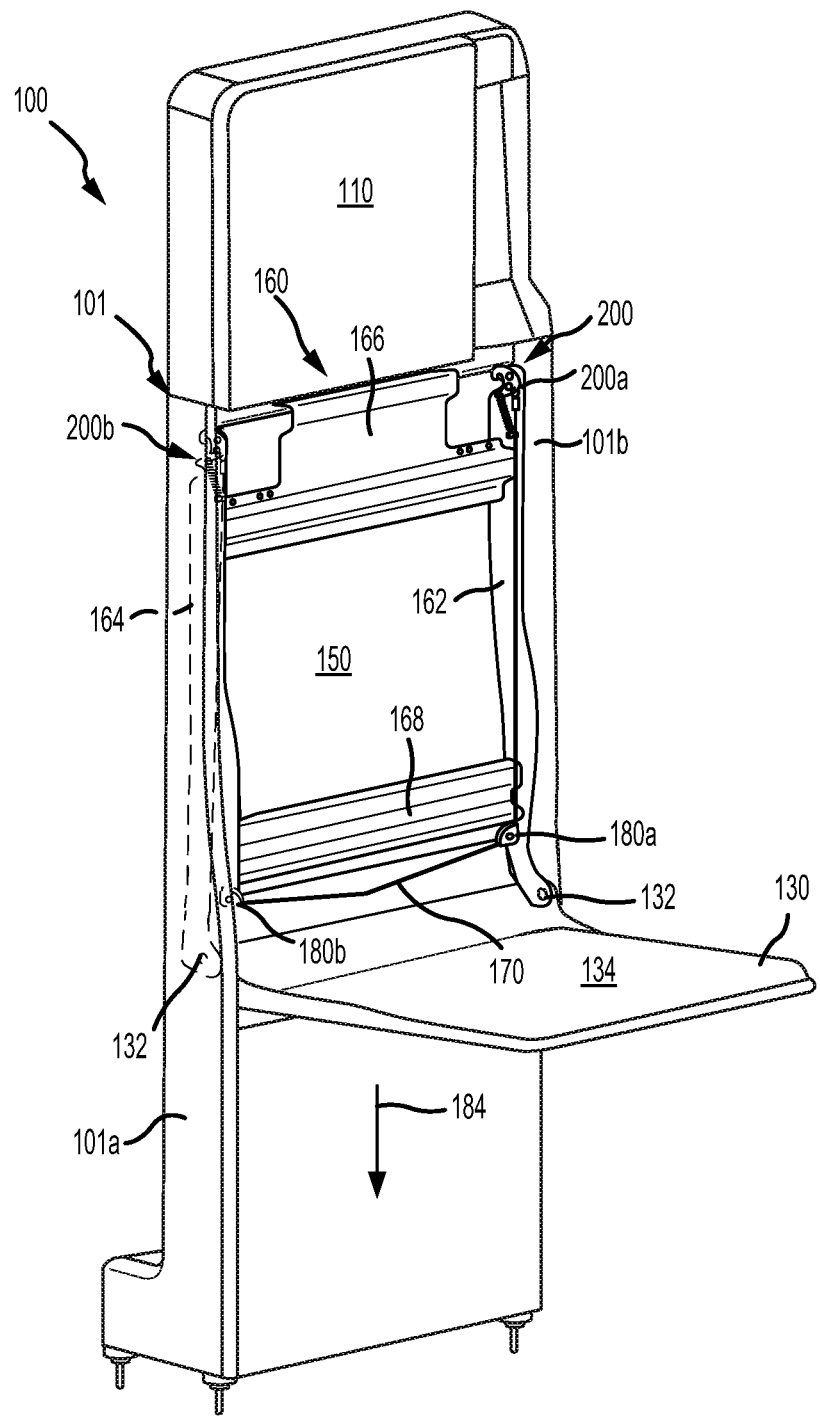
FIG. 2A illustrates a perspective view of a stowable seat having a releasing member coupled to a locking mechanism for a releasable backrest, accordance with various embodiments.

Referring to FIG. 2A, stowable seat 100 is shown with cushion 122 and fabric 136 removed for clarity. Stowable seat 100 may comprise a backrest support structure 160 (also referred to herein as a backrest support). Backrest support 160 may comprise vertical rails 162 and 164 located on opposing sides of backrest support 160. Vertical rail 162 may be located proximate housing wall 101b. Vertical rail 164 may be located proximate housing wall 101a. Vertical rails 162 and 164 may be configured to rotate about pivot joints 132. Backrest support 160 may further include an upper horizontal rail 166 and a lower horizontal rail 168. Upper horizontal rail 166 and lower horizontal rail 168 may each extend between vertical rails 162 and 164. Upper horizontal rail 166 may be located proximate head rest 110. Lower horizontal rail may be located proximate pivot joints 132.

One or more locking mechanism(s) 200 may be coupled to backrest support 160. For example, a first locking mechanism 200a may be coupled to vertical rail 162, and a second locking mechanism 200b may be coupled to vertical rail 164. In various embodiments, locking mechanisms 200a may be coupled to an end 188 of vertical rail 162 that is opposite pivot joint 132, and locking mechanisms 200b may be coupled to an end of vertical rail 164 that is opposite pivot joint 132.

Figure 4:
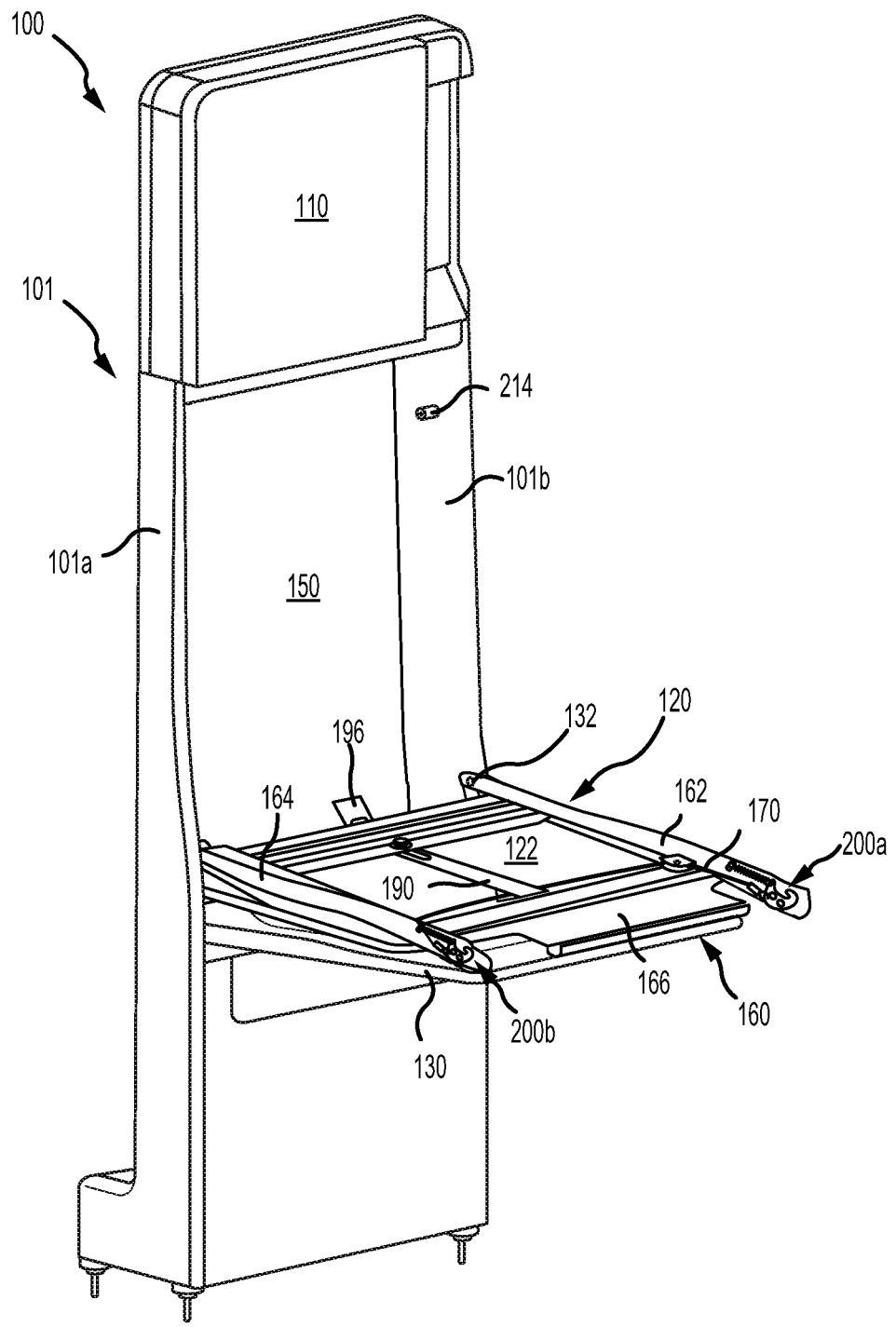
FIG. 4 illustrates a perspective view of a backrest support of a stowable seat in a released position, in accordance with various embodiments.

A releasing member 170 may be in operable communication with locking mechanisms 200a and 200b. Releasing member 170 may comprise a wire, rope, string, chord, or other member suitable for applying a load to locking mechanisms 200a and 200b. With momentary combined reference to FIGS. 1 and 2A, cushion 122 may be located over backrest support 160 and releasing member 170. Releasing member 170 may be located proximate a lower end 124 of cushion 122. Lower end 124 of cushion 122 may be generally opposite head rest 110. Releasing member 170 may be accessed by reaching behind cushion 122 and/or around fabric 136. In various embodiments, fabric 136 may be releasably coupled (e.g., coupled via snaps, buttons, hook and loop material, etc.) to backrest support 160. Releasing member 170 may be accessed by reaching behind fabric 136. In various embodiments and with momentary reference to FIG. 4, area 150 may be exposed by rotating seat pan 130 to the down position, as shown in FIG. 1, reaching behind fabric 136 to apply a load to releasing member 170, and then rotating backrest 120 toward seat pan 130.

With continued reference to FIG. 2A, in various embodiments, a release member guide 180a may be located proximate vertical rail 162, and a release member guide 180b may be located proximate vertical rail 164. Release member guides 180a and 180b may be coupled to vertical rails 162 and 164, respectively, and/or to lower horizontal rail 168. Releasing member 170 may be located through release member guides 180a and 180b. Release member guides 180a and 180b may be configured to align releasing member 170 with locking mechanisms 200a and 200b and with lower end 124 of cushion 122, with momentary reference to FIG. 1. Release member guides 180a and 180b may be configured to maintain a tautness of releasing member 170 such that applying a load to releasing member 170 in the direction of arrow 184 translates locking mechanisms 200a and 200b to an unlocked position.

Figure 2B:
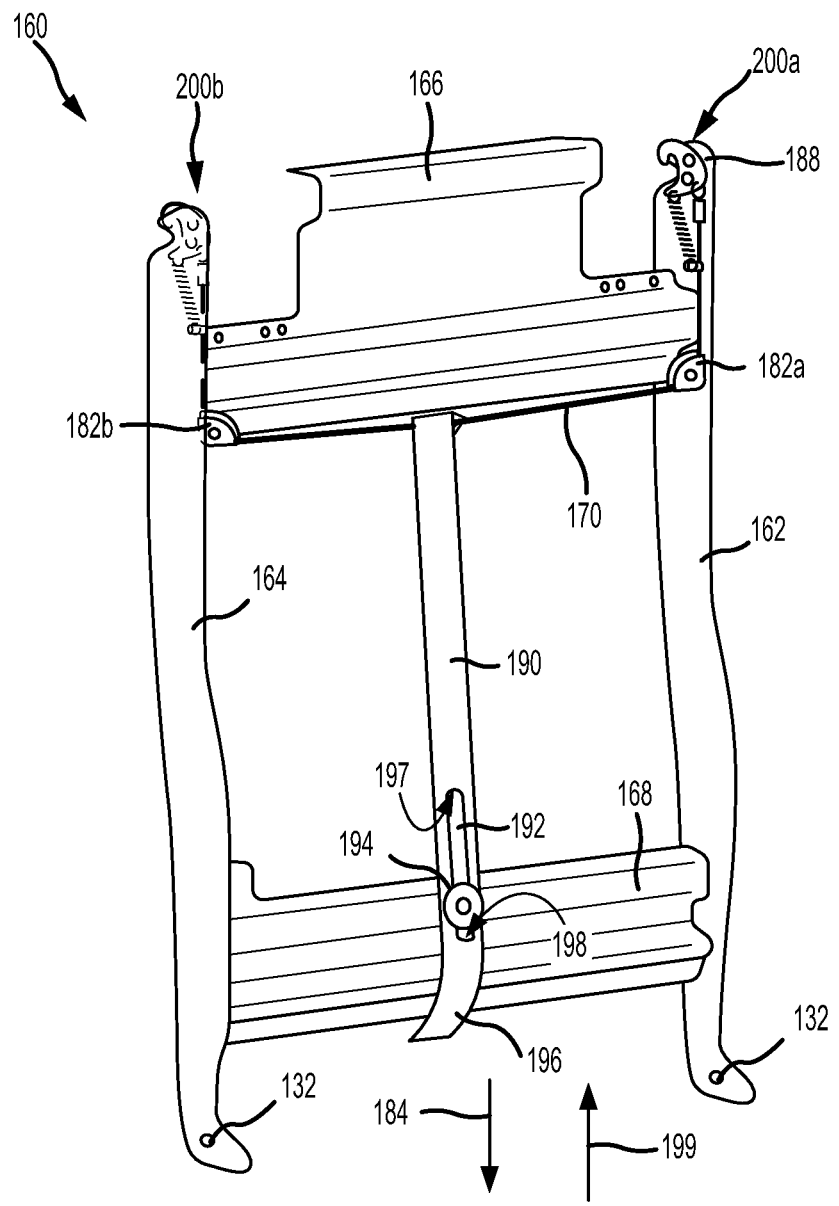
FIG. 2B illustrates, a perspective view of a backrest support having a strap coupled to a releasing member for a releasable backrest, in accordance with various embodiments.

With reference to FIG. 2B, in various embodiments, backrest support 160 may include release member guides 182a and 182b located proximate upper horizontal rail 166. Release member guides 182a and 182b may be coupled to vertical rails 162 and 164, respectively, and/or to upper horizontal rail 166. Releasing member 170 may be located through release member guides 182a and 182b.

In various embodiments a strap 190 may be coupled to and in operable communication with releasing member 170. Strap 190 may comprise a rope, tape, ribbon, webbing, or other suitable strap. Strap 190 may define an opening 192. A stop pin 194 may be located through opening 192. Stop pin 194 may be coupled to lower horizontal rail 168. Stop pin 194 and opening 192 may be configured to limit a translation of strap 190. For example, strap 190 may translate in the direction of arrow 184 until stop pin 194 contacts an end 197 of opening 192. Strap 190 may translate in the direction of arrow 199, until stop pin 194 contacts an end 198 of opening 192. Stop pin 194 and opening 192, in combination with release member guides 182a and 182b, may be configured to maintain a tautness of strap 190 and releasing member 170 such that a load applied to strap 190 in the direction of arrow 184 causes locking mechanisms 200a and 200b to translate to an unlocked position.

With momentary combined reference to FIG. 1 and FIG. 2B, cushion 122 may be located over backrest support 160, releasing member 170, and strap 190. An end 196 of strap 190 may be located proximate lower end 124 of cushion 122. Strap 190 may be accessed by reaching behind cushion 122 and/or around fabric 136. In various embodiments, fabric 136 may be releasably coupled (e.g., coupled via snaps, buttons, hook and loop material, etc.) to backrest support 160, and strap 190 may be accessed by reaching behind fabric 136. Stop pin 194 located in opening 192 may maintain end 196 of strap 190 in a constant position/location, thereby allowing an operator accessing area 150, with momentary reference to FIG. 4, to quickly and easily find end 196. For example, stop pin 194 and opening 192 may be configured to locate end 196 proximate to lower end 124 of cushion 122 and/or proximate to a midway point between vertical rails 162 and 164

Figure 3A:
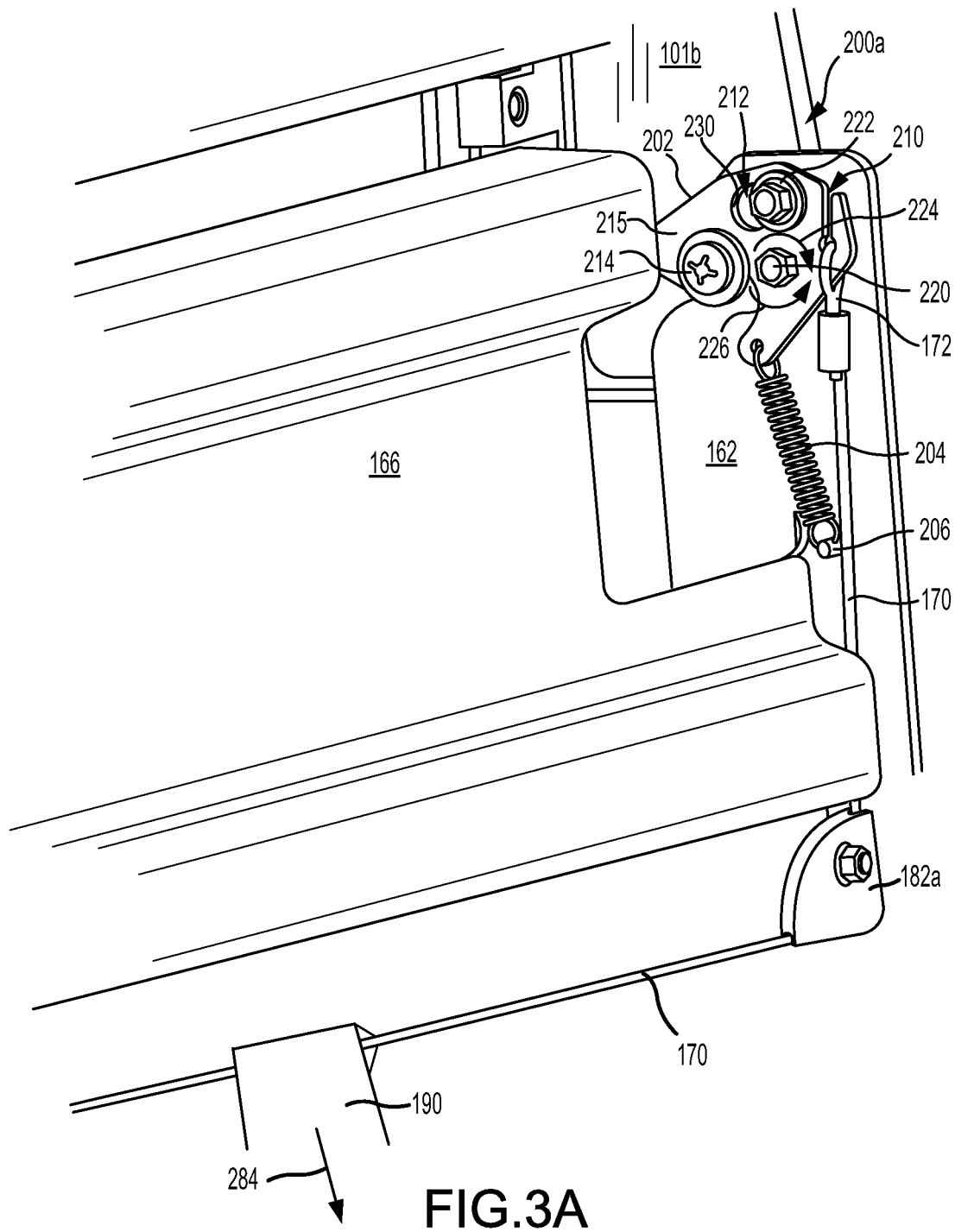
FIG. 3A illustrates a perspective view of a locking mechanism for a backrest support in a locked position, in accordance with various embodiments.
Figure 3B:
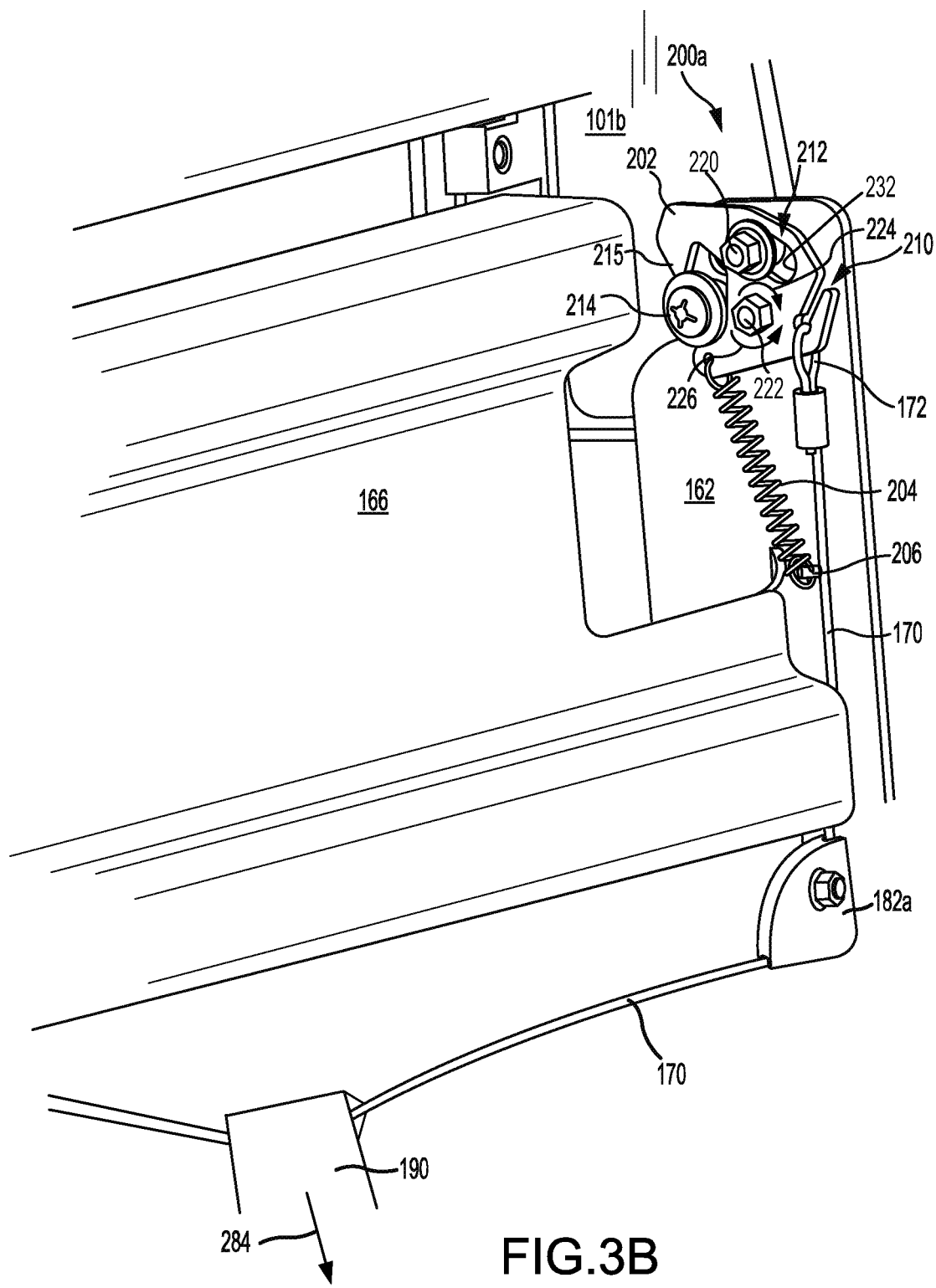
FIG. 3B illustrates a perspective view of a locking mechanism for a backrest support in an unlocked position, in accordance with various embodiments.

With reference to FIG. 3A and FIG. 3B, details of locking mechanism 200a are illustrated, in accordance with various embodiments. FIG. 3A illustrates locking mechanism 200a in a locked or secured position. FIG. 3B illustrates locking mechanism 200a in an unlocked or released position. While FIGS. 3A and 3B illustrate details of locking mechanism 200a, it should be understood that locking mechanism 200b, with momentary reference to FIG. 2B, may include the elements and functionalities as described herein with respect to locking mechanism 200a.

With combined reference to FIG. 3A and FIG. 3B, in various embodiments, locking mechanism 200a may comprise a latch 202. In the locked position, latch 202 may engage a locking post 214 coupled to housing wall 101b. For example, latch 202 may be hook or claw shaped. The shape of latch 202 may allow latch 202 to engage locking post 214 and limit or prevent translation of vertical rail 162 relative to housing wall 101b. Latch 202 may define a groove or channel 210. Releasing member 170 may be coupled to latch 202 by locating an end 172 of releasing member 170 within channel 210. Stated differently, in various embodiments, end 172 of releasing member 170 may comprise a loop and latch 202 may be located through the loop.

Releasing member 170 may be in operable communication with latch 202. For example, strap 190 applying a load 284 to releasing member 170 may cause latch 202 to rotate about a pivot joint 222 coupled to vertical rail 162. Stated differently, load 284 being applied to releasing member 170 may cause latch 202 to rotate relative to vertical rail 162. In response to load 284, latch 202 may rotate about pivot joint 222 in a first direction 224.

Locking mechanism 200a may include a biasing member 204. Biasing member 204 may comprise, for example, a coil spring. Biasing member 204 may be in operable communication with latch 202. In various embodiments, biasing member 204 may be coupled between latch 202 and an anchor pin 206 coupled to vertical rail 162. Rotating latch 202 in first direction 224 (i.e., applying load 284 to releasing member 170) may cause biasing member 204 to stretch and exert a restoring force on latch 202. Biasing member 204 may be configured to rotate latch 202 about pivot joint 222 in a second direction 226 opposite first direction 224. For example, releasing member 170 may be configured to rotate latch 202 about pivot joint 222 in a clockwise direction and biasing member 204 may be configured to rotate latch 202 about pivot joint 222 in a counter clockwise direction.

Latch 202 may define an aperture 212. In various embodiments, aperture 212 may be crescent-shaped. A stop pin 220 may be located through aperture 212. Stop pin 220 may be coupled to vertical rail 162. Stop pin 220 and aperture 212 may be configured to limit the rotation of latch 202 about pivot joint 222. For example, latch 202 may rotate in first direction 224 until stop pin 220 contacts an end 230 of aperture 212. Latch 202 may rotate in second direction 226 until stop pin 220 contacts an end 232 of aperture 212. Stop pin 220 and aperture 212 may be configured such that when stop pin 220 contacts end 230, latch 202 is disengaged from locking post 214 and backrest support 160 may be pivoted away from housing 101, as shown in FIG. 4.

With reference to FIG. 4, stowable seat 100 is illustrated with backrest 120 in a released position, in accordance with various embodiments. Disengaging locking mechanisms 200a and 200b from locking posts 214 may allow backrest support 160 to rotate away from housing 101. Backrest support 160 (and cushion 122) may rotate toward seat pan 130, thereby exposing an area 150 of housing 101 located behind cushion 122 and backrest support 160.

Figure 3C:
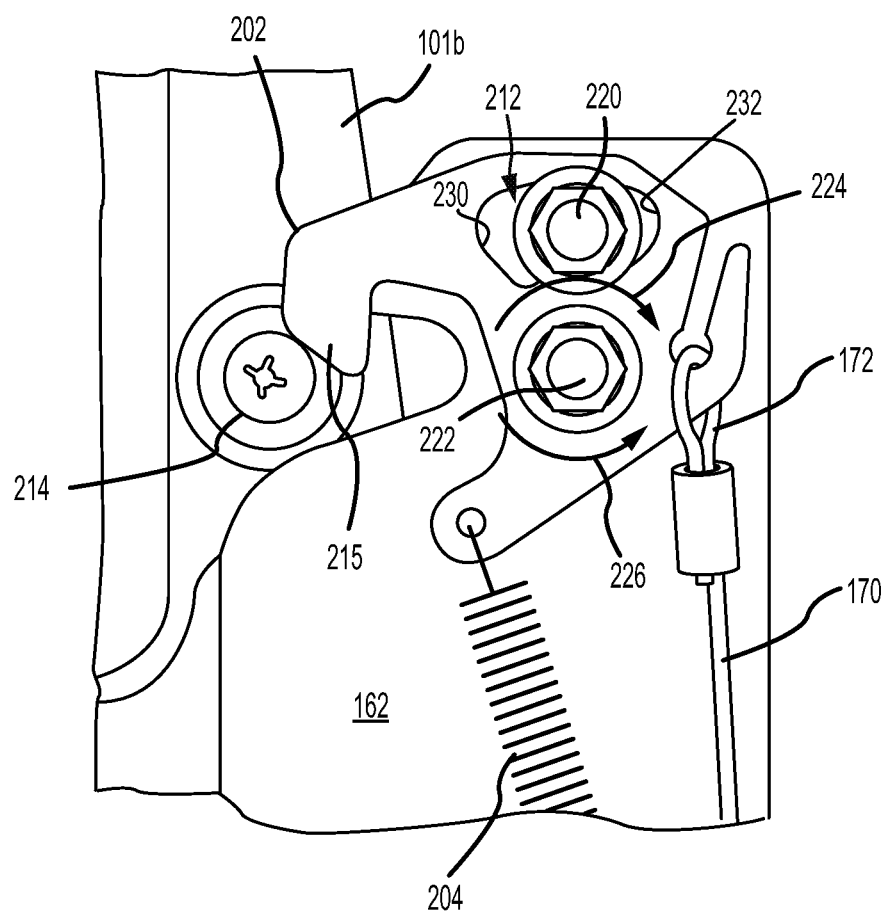
FIG. 3C illustrates a perspective view of a locking mechanism for a backrest support, in accordance with various embodiments.

With combined reference to FIGS. 2A, 3A, 3B, and 4, locking mechanisms 200a and 200b may be disengaged from locking posts 214 by applying a load 284 to releasing member 170. Load 284 may be generated by pulling on end 196 of strap 190. Load 284 may cause latches 202 to rotate in first direction 224, thereby disengaging latches 202 from locking posts 214 and allowing backrest 120 to pivot toward seat pan 130 and away from housing 101. Once load 284 is removed from releasing member 170, biasing members 204 may rotate latches 202 in second direction 226, thereby returning latches 202 to the locked position. With latches 202 returned to the locked position, backrest 120 may be re-secured to housing 101 by rotating backrest 120 toward housing 101 until locking mechanisms 200a and 200b have reengaged locking posts 214. Stated differently and with reference to FIG. 3C and FIG. 4, backrest 120 may be re-secured to housing 101 by applying a force great enough to cause a lead end 215 of latches 202 to pass over locking posts 214 (i.e., by applying a force greater than the force applied by biasing members 204). As lead end 215 passes over locking post 214, latch 202 may momentarily rotate in first direction 224. Once lead end 215 is no longer located over locking post 214, biasing member 204 may rotate latch 202 in second direction 226, thereby returning latch 202 to the locked position.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A backrest support for a stowable seat, comprising:
   a first vertical rail located proximate a first side of the backrest support, the first vertical rail being configured to rotate about a first pivot joint located at a lower end of the first vertical rail;
   a first locking mechanism coupled to the first side of the backrest support, the first locking mechanism comprising a first latch coupled to an upper end of the first vertical rail;
   a second vertical rail located proximate a second side of the backrest support opposite the first side of the backrest support, the second vertical rail being configured to rotate about a second pivot joint located at a lower end of the second vertical rail;
   a second locking mechanism coupled to the second side of the backrest support, the second locking mechanism comprising a second latch coupled to an upper end of the second vertical rail;
   a releasing member comprising a continuous elongated flexible member having a first end connected with the first latch and a second end connected with the second latch, wherein the releasing member is configured to rotate the first latch relative to the first vertical rail and the second latch relative to the second vertical rail such that applying a load on the releasing member rotates the first latch out of engagement with a first locking post and rotates the second latch out of engagement with a second locking post to allow the first vertical rail to pivot about the first pivot joint and the second vertical rail to pivot about the second pivot joint; and
   a strap coupled directly to the flexible member between the first end of the flexible member and the second end of the flexible member, wherein the strap is located between the lower end of first vertical rail and the lower end of the second vertical rail.

2. The backrest support of claim 1, further comprising:
   a first release member guide located proximate the first vertical rail;
   a second release member guide located proximate the second vertical rail, wherein the releasing member is located through the first release member guide and the second release member guide.

3. The backrest support of claim 1, wherein the first latch defines a first channel, and wherein at a first point of connection between the releasing member and the first latch, the releasing member is located in the first channel.

4. The backrest support of claim 3, wherein the second latch defines a second channel, and wherein at a second point of connection between the releasing member and the second latch, the releasing member is located in the second channel.

5. The backrest support of claim 1, further comprising:
   a first spring coupled to the first latch; and
   a second spring coupled to the second latch.

6. The backrest support of claim 1, further comprising a first stop pin located within a first aperture defined by the first latch, wherein the first stop pin and the first aperture are configured to limit rotation of the first latch.

7. The backrest support of claim 6, further comprising a second stop pin located within a second aperture defined by the second latch, wherein the second stop pin and the second aperture are configured to limit rotation of the second latch.

\* \* \* \* \*